United States Patent
Ohtsuka (10) Patent No.: US 6,282,591 B1
(45) Date of Patent: *Aug. 28, 2001

(54) INFORMATION PROCESSING APPARATUS AND DATA TRANSFER APPARATUS HAVING ELECTRIC POWER SUPPLIED FROM A CABLE INTERFACE

(75) Inventor: Kuniaki Ohtsuka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,119

(22) Filed: Oct. 20, 1997

(30) Foreign Application Priority Data

Oct. 21, 1996 (JP) .................................................. 8-297780

(51) Int. Cl.$^7$ .................................................. G06F 13/12

(52) U.S. Cl. ............................ 710/65; 713/300; 358/1.15

(58) Field of Search ........................ 710/65, 1; 709/253; 713/300, 310; 370/330; 345/21; 455/66; 395/114; 358/1.15

(56) References Cited

U.S. PATENT DOCUMENTS

| | | | |
|---|---|---|---|
| 5,767,844 | * 6/1998 | Stoye | 345/212 |
| 5,787,259 | * 7/1998 | Haroun | 709/253 |
| 5,857,065 | * 1/1999 | Suzuki | 395/114 |
| 5,870,391 | * 2/1999 | Nago | 370/330 |
| 5,970,392 | * 10/1999 | Hatae | 455/66 |

OTHER PUBLICATIONS

Universal Serial Bus Specification, Revision 1.0, Jan. 15, 1996, pp. 30, 131–135.*
Infrared Data Associaton Serial Infrared Physical Layer Specification, Version 1.3, Oct. 15, 1998, pp. 10–12.*

(List continued on next page.)

*Primary Examiner*—Thomas Lee
*Assistant Examiner*—Thuan Du
(74) *Attorney, Agent, or Firm*—Fitzpatrick, Cella, Harper & Scinto (57) ABSTRACT

The invention provides a data transfer apparatus which makes it possible to perform communication between an apparatus connected to a serial communication system via a communication line and a terminal device provided with an infrared communication unit. A data transfer device is set such that an upstream data transmitter and a downstream data transmitter are connected to each other via the data transfer device. In this state, in response to a command input via a keyboard or a mouse, data to be printed is transmitted to a printing apparatus via the data transfer apparatus. The data transfer apparatus receives at its light receiving device an infrared signal from a personal computer. An infrared communication controller derives the content of data. A controller checks whether the printing apparatus is a busy state or not. If the printing apparatus is available, then the controller switches the state of the data transfer device into a state in which the downstream data transmitter and the coder/decoder are connected to each other. After that, data transfer apparatus receives the data to be printed from the personal computer via an infrared ray, and the received data is transferred to the printing apparatus via the light receiving device, an infrared communication controller, a format converter, a coder/decoder, the data transfer device, the downstream data transmitter, and the a pair of signal lines of a communication line. According to the received data, the printing apparatus performs a printing operation.

14 Claims, 9 Drawing Sheets

OTHER PUBLICATIONS

JetEye Printer Data Sheet, pp. 1–2 [retrieved on Oct. 28, 1999]. Retrieved from; the Internet:<URL: http://www.extendedsystems.com/prodinfo/infrared.html>.*

ACTiSYS IrDA IR Printer Adapter, pp. 1–3 [retrieved on Oct. 28, 1999]. Retrieved from the Internet:<URL: http://www.actisys.com/ACTIR100.html>.*

Richard Hall, "Infrared interface for HP LaserJet printers," The HP Palmtop Paper, vol. 1, Jan/Feb 1992. Retrieved from the Internet<URL:http://www.palmtoppaper.com/ptphtml/1/ptp10017.htm>.*

* cited by examiner

INFORMATION PROCESSING APPARATUS AND DATA TRANSFER APPARATUS HAVING ELECTRIC POWER SUPPLIED FROM A CABLE INTERFACE

BACKGROUND OF THE INVENTION

1. Field of the Invention

The present invention relates to an information processing apparatus and a data transfer apparatus such as a data transfer apparatus located between information processing apparatus and a printing apparatus and provided with wireless communication means.

2. Description of the Related Art

A great number of notebook personal computers and portable information terminals provided with wireless communication means using an infrared ray are used. On the other hand, most printing apparatus such as ink-jet printers are not provided with infrared communication means. Therefore, when data to be printed is transmitted from a terminal device to a printing apparatus via infrared rays, it is required that a data transfer apparatus should be connected to an interface of the printing apparatus.

In general, no electric power is supplied from the interface of the printing apparatus to the data transfer apparatus. Therefore, to operate the data transfer apparatus, it is required to supply electric power to the data transfer apparatus from a special power supply device such as an AC adapter connected to a wall outlet. However, the cord of the AC adapter causes not only a poor appearance but also a limitation in the installation place, thus impairing the advantages of the wireless communication.

SUMMARY OF THE INVENTION

It is an object of the present invention to provide an information processing apparatus in which all or at least one of the above problems are solved.

It is another object of the present invention to provide an information processing apparatus capable of performing communication via various types of interfaces.

It is still another object of the present invention to provide an information processing apparatus suitable for use with a printer.

It is still another object of the present invention to provide an information processing apparatus capable of directly controlling a printer via wireless transmission.

It is a further object of the present invention to provide a data transfer apparatus by which communication can be performed between an apparatus connected to a serial communication system via a communication line and a terminal device having wireless communication means.

According to an aspect of the present invention to achieve the above objects, there is provided a data transfer apparatus having power supplying means for supplying electric power via a communication line, the data transfer apparatus being characterized in that the data transfer apparatus comprises: driving means for operating each part with electric power supplied via the communication line; wireless communication means using infrared rays; and connection means and interconversion means for making a connection between the wireless communication means and communication means via the communication line.

The invention further provides a novel information processing apparatus having novel capability.

These and other aspects and features of the invention will become apparent from the following description and the accompanying drawings illustrating preferred embodiments of the invention.

DESCRIPTION OF THE PREFERRED EMBODIMENTS

The present invention will be described in further detail below with reference to preferred embodiments in conjunction with the accompanying drawings.

Figure 1:
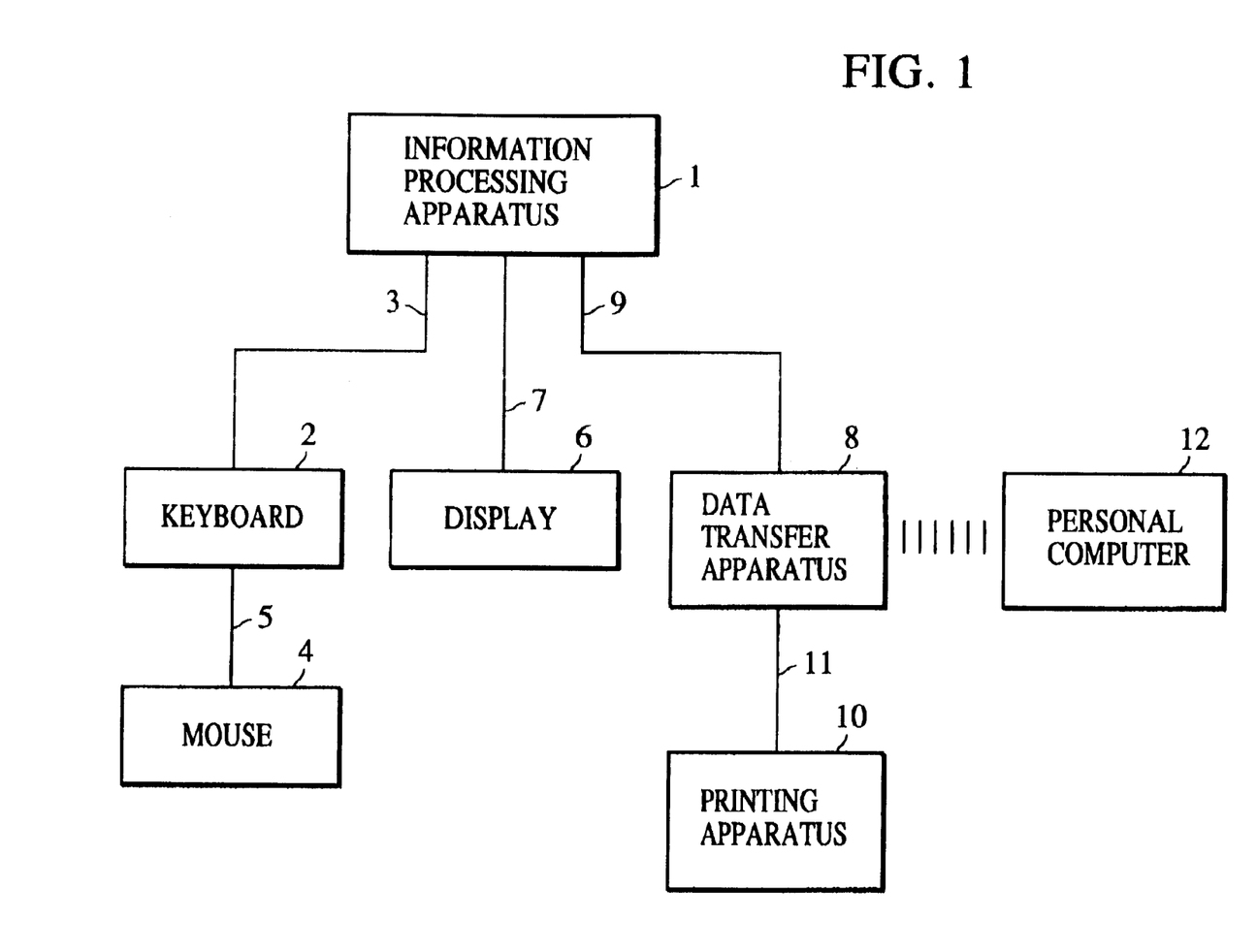
FIG. 1 is a block diagram illustrating a communication system according to a first embodiment of the invention.

FIG. 1 is a block diagram illustrating a first embodiment of a communication system including a data transfer apparatus, according to the present invention. An information processing apparatus 1 serving as a host of the communication system is connected to a keyboard 2 via a communication line 3 so that a user can input various commands and data to the information processing apparatus 1 via the keyboard 2. The keyboard 2 is connected via a communication line 5 to a mouse 4 used by the user to designate coordinates. The output of the information processing apparatus 1 is connected via a communication line 7 to a display 6 for displaying visual information according to a received monitor signal. Furthermore, the output of the information processing apparatus 1 is connected via a communication line 9 to the data transfer apparatus 8 which is in turn connected via a communication line 11 to a printing apparatus 10 such as an ink-jet printer. The data transfer apparatus 8 is adapted to communicate with a personal computer 12 such as a notebook personal computer via infrared wireless communication means.

Figure 2:
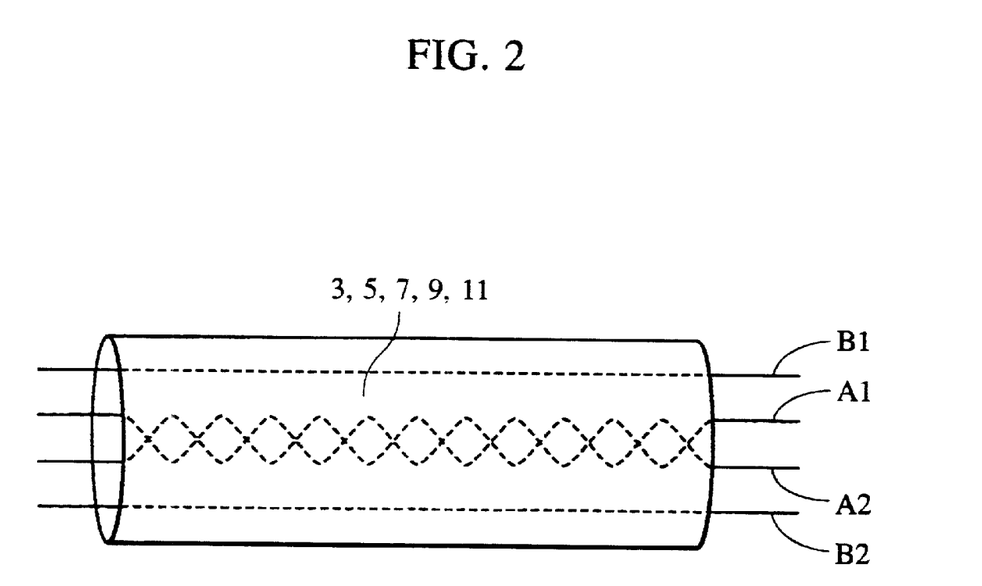
FIG. 2 is a schematic diagram illustrating a communication line.

As shown in FIG. 2, the communication lines 3, 5, 7, 9, and 11 each comprise a pair of signal lines A1 and A2 and a pair of power supply lines B1 and B2. The keyboard 2 operates with electric power received from the information processing apparatus 1 via the communication line 3. The mouse 4 receives electric power via the keyboard 2 and the communication line 5. The keyboard 2 transmits commands and data input by a user to the information processing apparatus 1 via the communication line 3. The keyboard 2 also has the capability of receiving a coordinate designating signal from the mouse 4 via the communication line 5, and transferring it over the communication line 3.

Figure 3:
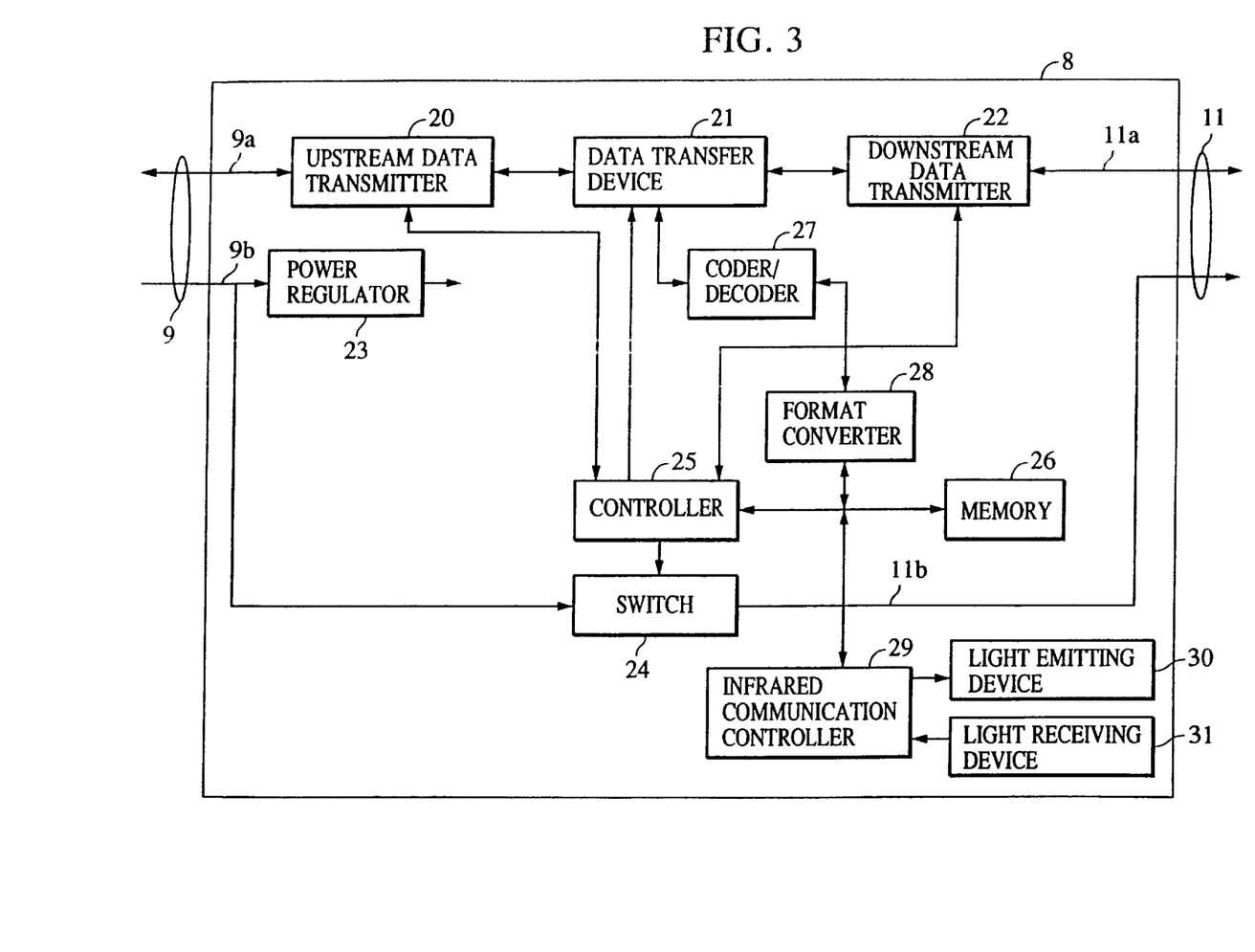
FIG. 3 is a block diagram illustrating a data transfer apparatus.

FIG. 3 is a block diagram illustrating the data transfer apparatus 8. The data transfer apparatus 8 is connected to the information processing apparatus 1 via the communication line 9 and is also connected to the printing apparatus 10 via the communication line 11. The pair of signal lines 9a for use of data transmission, of the communication line 9, is connected to an upstream data transmitter 20 serving as a driver/receiver for transmitting and receiving data to and from the information processing apparatus 1. The upstream data transmitter 20 is connected to a data transfer device 21 which is in turn connected to a downstream data transmitter 22 serving as a driver/receiver for transmitting and receiving data to and from the printing apparatus 10. The data transfer device 21 controls the connection between the upstream data transmitter 20 and the downstream data transmitter 22, and also controls the connection between the upstream data transmitter 20 and a coder/decoder 27 which will be described later and/or the connection between the coder/decoder 27 and the downstream data transmitter 22.

On the other hand, the pair of power supply lines 9b is connected to a power regulator 23 which converts electric power supplied from the information processing apparatus 1 to a voltage suitable for use in the data transfer apparatus 8 and supplies the resultant voltage to various parts in the data transfer apparatus 8. The pair of power supply lines 9b is also connected to a switch 24 which is closed when electric power is supplied to the printing apparatus 10 located at the downstream side and is opened when such electric power is not necessary.

The data transfer apparatus 8 includes a controller 25 for controlling various parts of the data transfer apparatus 8. The controller 25 is connected to the upstream and downstream data transmitters 20 and 22, the data transfer device 21, the switch 24, and a memory 26. The memory 26 comprises a read-write memory serving as a buffer and a read-only memory in which program instructions are written beforehand for use by the controller 25.

The data transfer device 21 is connected to the coder/decoder 27 which is connected to a format converter 28. The format converter 28 is connected to an infrared communication controller 29, the controller 25, and the memory 26. The output of the infrared communication controller 29 is connected to a light emitting device 30 including an infrared LED and a driver. The output of a light receiving device 31 including a pin photodiode and an amplifier is connected to the infrared communication controller 29.

The coder/decoder 27 encodes the output signal of the format converter 28 according to a method predefined in the communication system, and transmits the resultant coded data to the data transfer device 21. The coder/decoder 27 also decodes the signal received from the data transfer device 21 and transmits the resultant decoded signal to the format converter 28. The data transmitted from the infrared communication controller 29 to the upstream data transmitter 20 or the downstream data transmitter 22 is converted by the format converter 28 into a format predefined in the communication system shown in FIG. 1. The format converter 28 also detects a signal transmitted to the infrared communication controller 29 from the upstream data transmitter 20 or the downstream data transmitter 22, and decomposes the format so as to extract a necessary data part.

The format converter 28 may have both capability of converting data in the format used in infrared communication to data in the format used in cable communication according to the present embodiment and capability of converting data used in cable communication to data in the format used in infrared communication according to the present embodiment.

The light receiving device 31 receives an infrared signal transmitted from the notebook personal computer 12, converts the received signal to an electric signal, and amplifies it to a predetermined level. The light emitting device 30 converts a signal output from the infrared communication controller 29 to an infrared signal. The infrared communication controller 29 converts data, which is to be transmitted in the form of an infrared signal, from parallel to serial form, and constructs a frame in a predefined form including an error detection signal. The infrared communication controller 29 then modulates the frame of data according to a predefined method, and outputs the resultant modulated data to the light emitting device 30. The infrared communication controller 29 also demodulates the signal received from the light receiving device 31, extracts a synchronizing signal from a frame, detects an error detection signal, decomposes the frame into data, converts the data in serial form to data in parallel form, and outputs the resultant data.

Figure 4:
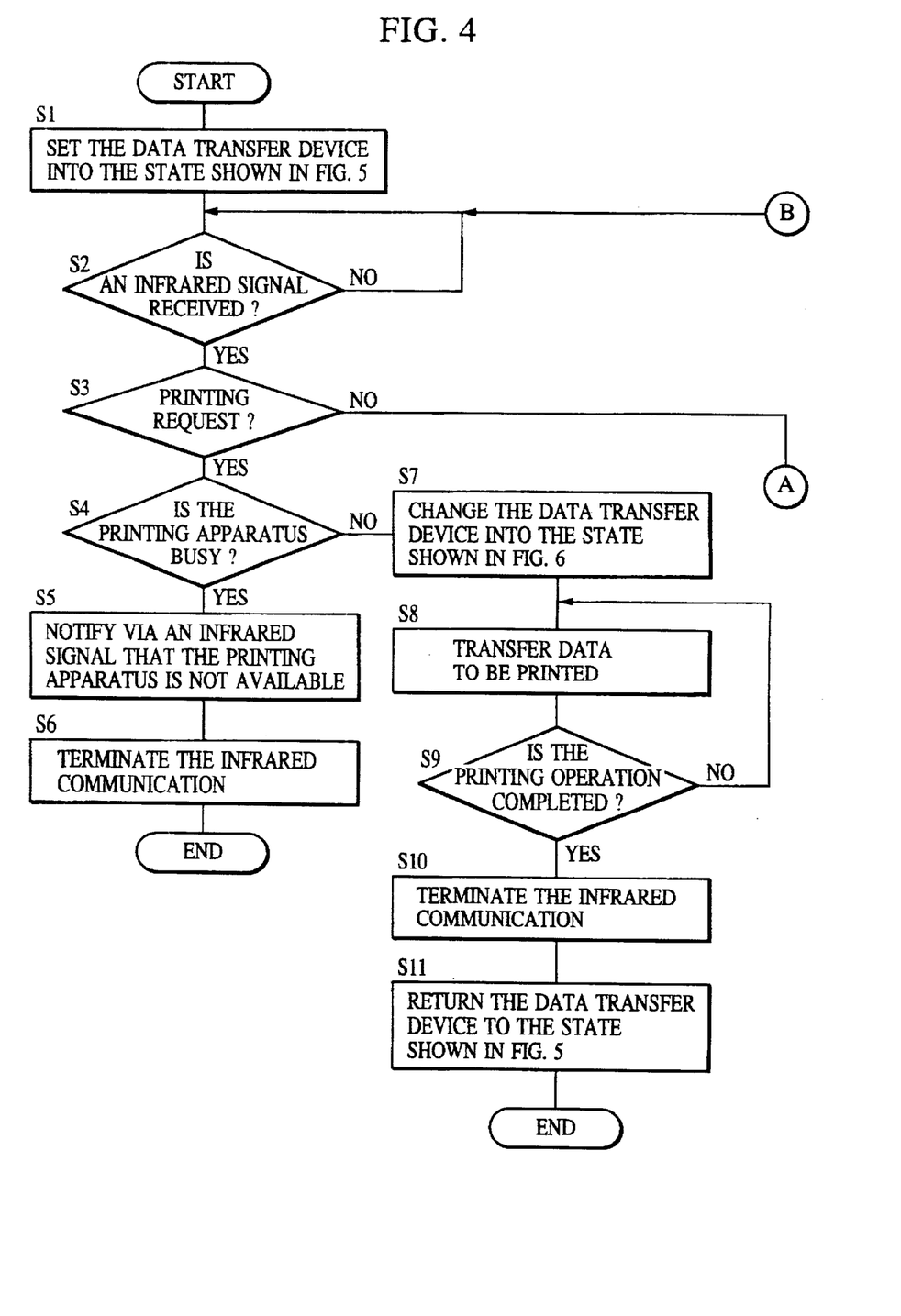
FIG. 4 is a flow chart.

FIG. 4 is a flow chart illustrating the operation of transmitting data, which is to be printed, from the notebook personal computer 12 to the printing apparatus 10 via the data transfer apparatus 8. Each part of the data transfer apparatus 8 operates with electric power which is generated by the power regulator 23 by means of conversion from the electric power supplied from the information processing apparatus 1 located at the upstream side. The controller 25 controls the switch 24 so as to supply electric power to an apparatus located at the downstream side as required. The above controlling operation is performed in accordance with the result of communication with the apparatus located at the downstream side. In this specific embodiment, the apparatus located at the downstream side and connected to the data transfer apparatus 8 is the printing apparatus 10. In this case, the printing apparatus 10 cannot operate with electric power supplied via the communication line 11, and thus the switch 24 should be opened. If the controller 25 detects that the downstream apparatus is a printing apparatus ready for a printing operation, the controller 25 opens the switch 24 according to the detection result.

Figure 5:
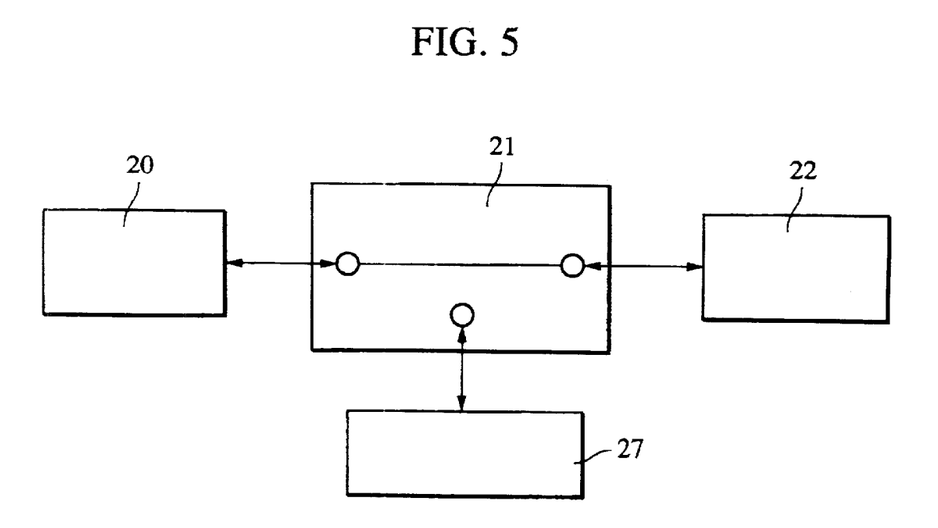
FIG. 5 is a schematic representation of a connection state of a data transfer device.

At the first step S1, the data transfer device 21 is set such that the upstream data transmitter 20 and the downstream data transmitter 22 are connected to each other via the data transfer device 21 as shown in FIG. 5. This makes it possible for the printing apparatus 10 to receive data to be printed from the information processing apparatus 1. That is, in response to a command input via the keyboard 2 or the mouse 4, the information processing apparatus 1 transmits data, which is to be printed, to the printing apparatus 10 via the communication line 9, the data transfer apparatus 8, and the communication line 11.

In the next step S2, the data transfer apparatus 8 judges whether the light receiving device 31 has received an infrared signal from the notebook personal computer 12 provided with infrared wireless communication means. In step S3, the infrared communication controller 29 derives the content of data, and the controller 25 analyzes the content of data. If it is concluded that the content of data is a printing request, then the process goes to step S4 and the controller 25 checks whether the printing apparatus 10 is in a busy state. This checking may be accomplished for example by sending an inquire signal to the information processing apparatus 1 via the upstream data transmitter 20 and the pair of signal lines 9a, or by monitoring the downstream data transmitter 22 so as to check whether some signal is being transmitted to the printing apparatus 10. Alternatively, the controller 25 may send an inquire signal directly to the printing apparatus 10. If the printing apparatus 10 is busy, then the process goes to step S5 in which the controller 25 sends a printer-busy signal to the personal computer 12 via the infrared communication controller 29 and the light emitting device 30 to notify that the printing apparatus is not available. Then in step S6, the infrared communication is terminated.

Figure 6:
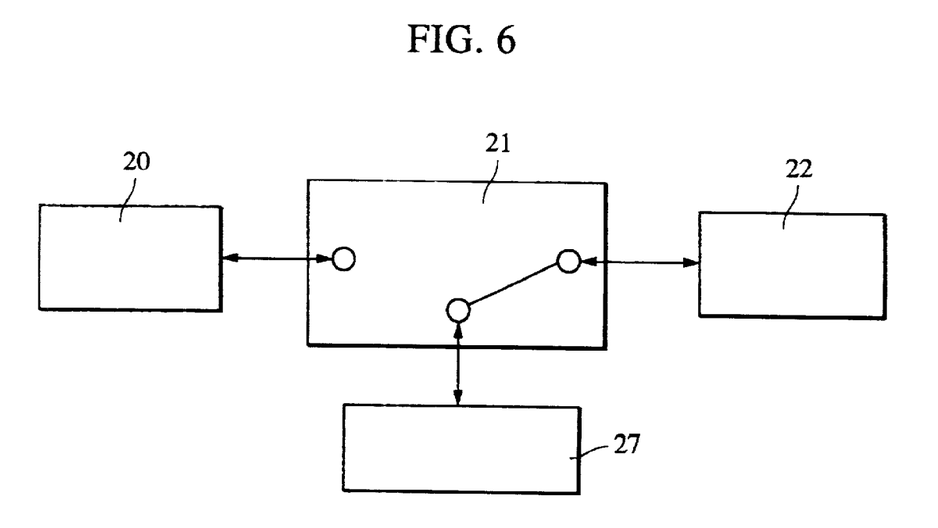
FIG. 6 is a schematic representation of another connection state of the data transfer device.

On the other hand, if it is concluded in step S4 that the printing apparatus 10 is not busy, then, in step S7, the controller 25 sets the data transfer device 21 into a state in which the downstream data transmitter 22 and the coder/decoder 27 are connected to each other as shown in FIG. 6. Then in step S8, the data transfer apparatus 8 receives data to be printed from the personal computer 12 via an infrared ray, and the data transfer apparatus 8 transmits the received data to the printing apparatus 10 via the light receiving device 31, the infrared communication controller 29, the format converter 28, the coder/decoder 27, the data transfer device 21, the downstream data transmitter 22, and the pair of signal lines 11a of the communication line 11. According to the received data, the printing apparatus 10 performs printing operation.

If step S9 concludes that all data to be printed has been transmitted from the personal computer 12, then the process goes to step S10 and the infrared communication between the data transfer apparatus 8 and the personal computer 12 is terminated. Then in step S11, the controller 25 returns the state of the data transfer device 21 shown in FIG. 6 into the state shown in FIG. 5.

As described above, the data transfer apparatus 8 makes it possible for the printing apparatus 10 connected to the communication system shown in FIG. 1 to receive and print the data transmitted from the notebook personal computer 12. The operation of the data transfer apparatus 8 is possible without requiring an additional separate power supply.

Figure 7:
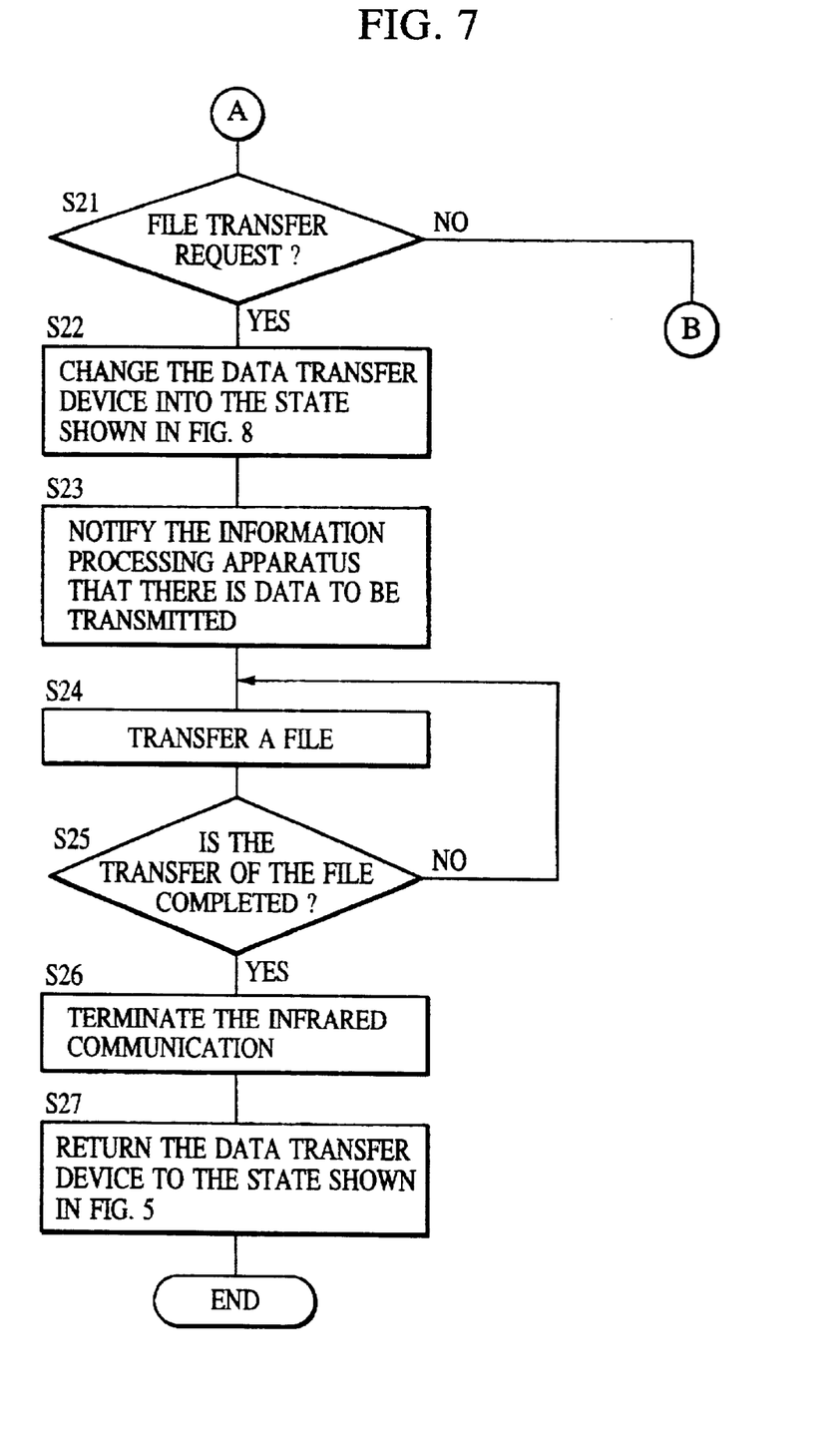
FIG. 7 is a flow chart illustrating an operation according to a second embodiment of the invention.

FIG. 7 is a flow chart illustrating an operation according to a second embodiment of the invention. In this second embodiment, the same communication system as that shown in FIG. 1, the same data transfer apparatus 8 as that shown in the block diagram of FIG. 3, and the same communication lines 9 and 11 as those shown in FIG. 3 are also used. In step S21, if it is concluded that the infrared signal received from the notebook personal computer is a signal requesting that a file be transferred to the information processing apparatus 1, then the process goes to step S22 and the controller 25 switches the data transfer device 21 from the state shown in FIG. 5 to the state shown in FIG. 8. Then in step S23, the controller 25 sends a message to the information processing apparatus 1 via the upstream data transmitter 20 to inform it that there is data to be transmitted to the information processing apparatus 1. Thus, in step S24, the file is transferred from the personal computer 12 to the information processing apparatus 1.

The operation of transferring the data from the personal computer 12 to the information processing apparatus 1 is performed as follows. If the light receiving device 31 receives an infrared signal from the personal computer 12, it converts the received infrared signal to an electric signal. The infrared communication controller 29 derives a synchronizing signal, detects an error detection signal, decomposes a frame into individual data, and converts the data from serial to parallel form. The resultant data is temporarily stored in the memory 26 via the controller 25 or by means of DMA (direct memory access).

Furthermore, the data is converted by the format converter 28 into a format suitable for being transmitted via the communication line 9, and then coded by the coder/decoder 27 according to a coding scheme associated with communication via the communication line 9. The resultant data is transmitted to the upstream data transmitter 20 via the data transfer device 21. The upstream data transmitter 20 transmits the data to the information processing apparatus 1 via the pair of signal lines 9a.

Conversely, the operation of transferring data from the information processing apparatus 1 to the personal computer 12 is performed as follows. If the upstream data transmitter 20 receives a signal via the pair of signal lines 9a, the signal is applied to the coder/decoder 27 via the data transfer device 21. On reception of the signal, the coder/decoder 27 decodes it. The format converter 28 detects, from the format used in communication via the communication line 9, that the data is directed to the personal computer 12. The format converter 28 then converts the data from serial to parallel form and temporarily stores it in the memory 26.

The data is then converted by the infrared communication controller 29 from parallel to serial form. A frame in a predetermined form is constructed, a check code serving as an error detection signal is calculated, and the resultant code is added to the data. The data is then modulated according to a modulation scheme suitable for being transmitted by an infrared ray. The modulated signal is then converted by the light emitting device 30 to an infrared signal and transmitted to the personal computer.

In step S25, if all data of the file has been transmitted, then in step S26 a process of terminating the infrared communication between the personal computer 12 and the controller 25 is performed via the infrared communication controller 29, the light emitting device 30, and the light receiving device 31. In step S27, the controller 25 returns the state of the data transfer device 21 to the original state shown in FIG. 5.

As described above, the data transfer apparatus 8 makes it possible to transfer a file between the personal computer 12 and the information processing apparatus 1 connected to the data transfer apparatus 8 via the communication line 9. The data transfer apparatus 8 operates with electric power which is converted by the power regulator 23 from the electric power supplied from the information processing apparatus 1 via the pair of power supply lines 9b, and therefore any special additional power supply is unnecessary.

Figure 8:
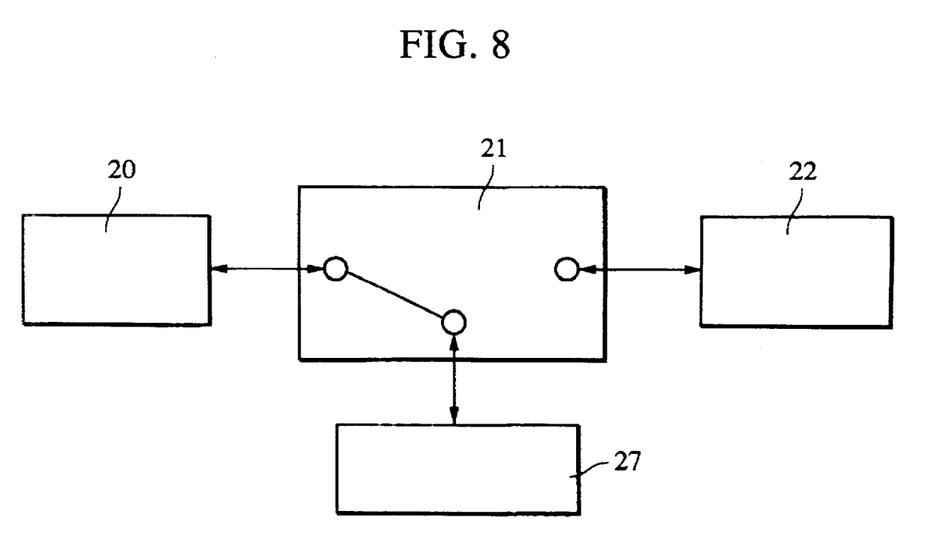
FIG. 8 is a schematic representation of another connection state of the data transfer device.
Figure 9:
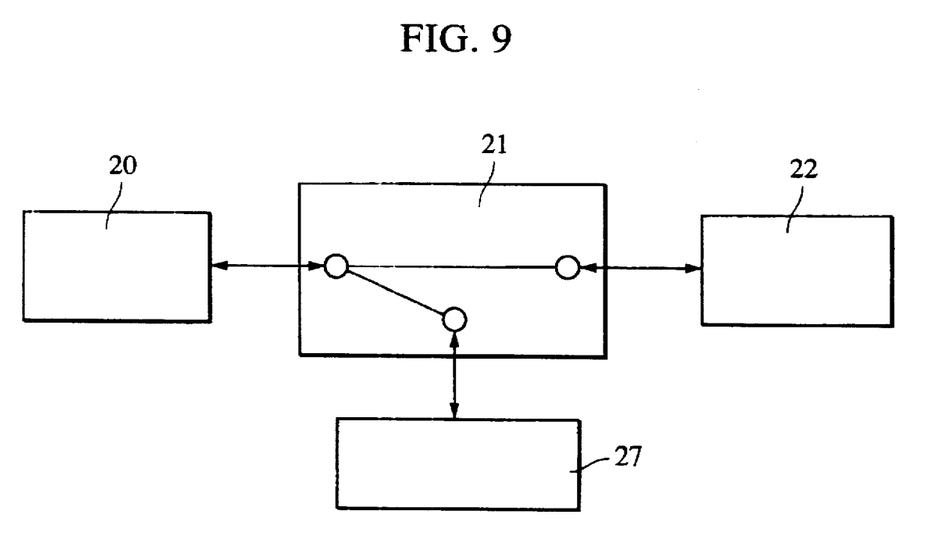
FIG. 9 is a schematic representation of a connection state of the data transfer device employed in a third embodiment of the invention.

FIG. 9 illustrates the data transfer device 21 being in a state which occurs in a third embodiment of the invention. In this third embodiment, as opposed to the second embodiment in which the data transfer device 21 is set in step S22 as shown in FIG. 8, the data transfer device 21 is set such that the coder/decoder 27 is connected while keeping the connection of the downstream data transmitter 22. In this embodiment, thus, a signal received by the upstream data transmitter 20 via the pair of signal lines 9a is transmitted via the data transfer device 21 to both the downstream data transmitter 22 and the coder/decoder 27. The downstream data transmitter 22 directly transmits the data to the printing apparatus 10 via the pair of signal lines 11a. The printing apparatus 10 judges whether the data includes some data directed to the printing apparatus 10. If such data is detected, the printing apparatus 10 derives the data and prints it. If there is no data directed to the printing apparatus 10, the received data is neglected.

The coder/decoder 27 decodes all received data and supplies the decoded data to the format converter 28. The format converter 28 analyzes the format of the received signal, and judges whether there is data to be transmitted from the controller 25 to the personal computer 12. If there is such data, the format converter 28 transmits the data to the infrared communication controller 29.

In the above operation, it is required that a signal directed from the downstream data transmitter 22 to the upstream data transmitter 20 should be prevented from arriving at the coder/decoder 27. Similarly, it is also required that a signal directed from the coder/decoder 27 to the upstream data transmitter 20 should be prevented from arriving at the downstream data transmitter 22.

In the case where data to be printed is transmitted when the data transfer device 21 is in the connection state shown in FIG. 9, the information processing apparatus 1 transmits data directed to the printing apparatus 10. In this case, data to be transmitted to the personal computer 12 is transmitted together with an identifier indicating that the data is directed to the personal computer 12. Thus, both signals may be received without switching the connection state of the data transfer device 21. When the data transfer device 21 is in the connection state shown in FIG. 9, if a printing request is issued from the notebook personal computer, the data transfer device 21 may be switched to the connection state shown in FIG. 6.

Although in the above embodiments, the communication line comprises a pair of signal lines and a pair of power supply lines, the communication line may also comprise two or more pairs of signal lines. Furthermore, the data transfer apparatus 8 may include a plurality of downstream data transmitters.

In the present invention, as described above, when data to be printed is transmitted to a printing apparatus from a notebook personal computer provided with infrared communication means or from a portable information terminal, the transmission can be easily performed via a data transfer apparatus connected to the printing apparatus without requiring the data transfer apparatus to have a special power supply such as an AC adapter and thus without causing a limitation in the installation place which would other wise occur due to a cord of the AC adapter or without requiring an additional operation for connection. Furthermore, data transmission from the information processing apparatus to the printing apparatus, transmission of data to be printed from the notebook personal computer or the portable information terminal to the printing apparatus, and data transmission between the information processing apparatus and the notebook personal computer or the portable information terminal are all possible without having to change the connection of the communication lines.

According to the present embodiment of the invention, as described above, the data transfer apparatus includes driving means for operating various parts with electric power supplied via the communication line, and connection means and interconversion means for making a connection between the wireless communication means and communication means via the communication line thereby making it possible to easily transfer data between the serial communication system using the communication line and the terminal device provided with the infrared communication means. Therefore, it is possible to realize a simple communication system.

Figure 10:
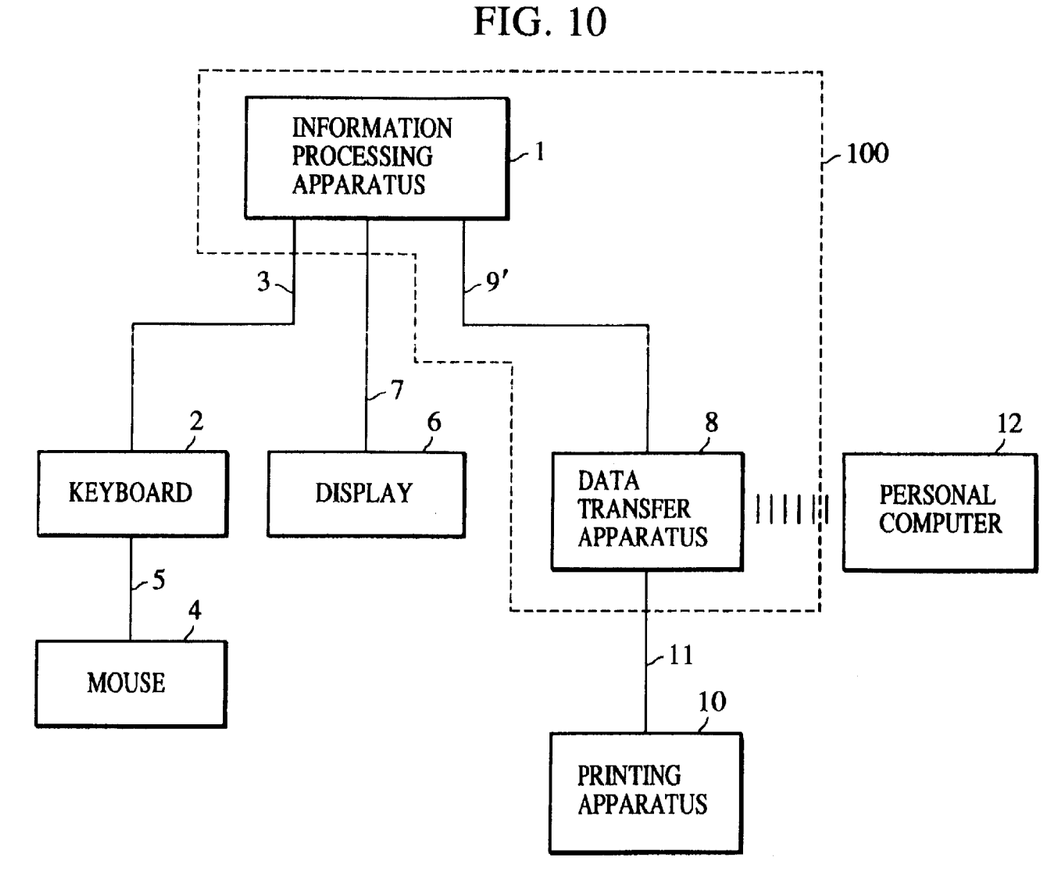
FIG. 10 is a block diagram illustrating an embodiment of an information processing apparatus according to the invention.

In the embodiments described above, the information processing apparatus 1, the data transfer apparatus 8, and the printing apparatus 10 are provided in a separate fashion, and they are connected to one another via communication lines having such the structure shown in FIG. 2. Alternatively, the information processing apparatus 1 and the data transfer apparatus 8 may be combined into an integrated apparatus 100 as shown in FIG. 10, and the integrated apparatus 100 may be connected to the printing apparatus 10 via the communication line shown in FIG. 2. In this case, the communication line denoted by reference numeral 9' in FIG. 10 is not limited to such the type of communication line shown in FIG. 2 but other types of communication lines may also be employed. That is, what is essential to the present invention is that the electric power for the data transfer apparatus 8 is supplied from the power supply of the information processing apparatus 1.

Figure 11:
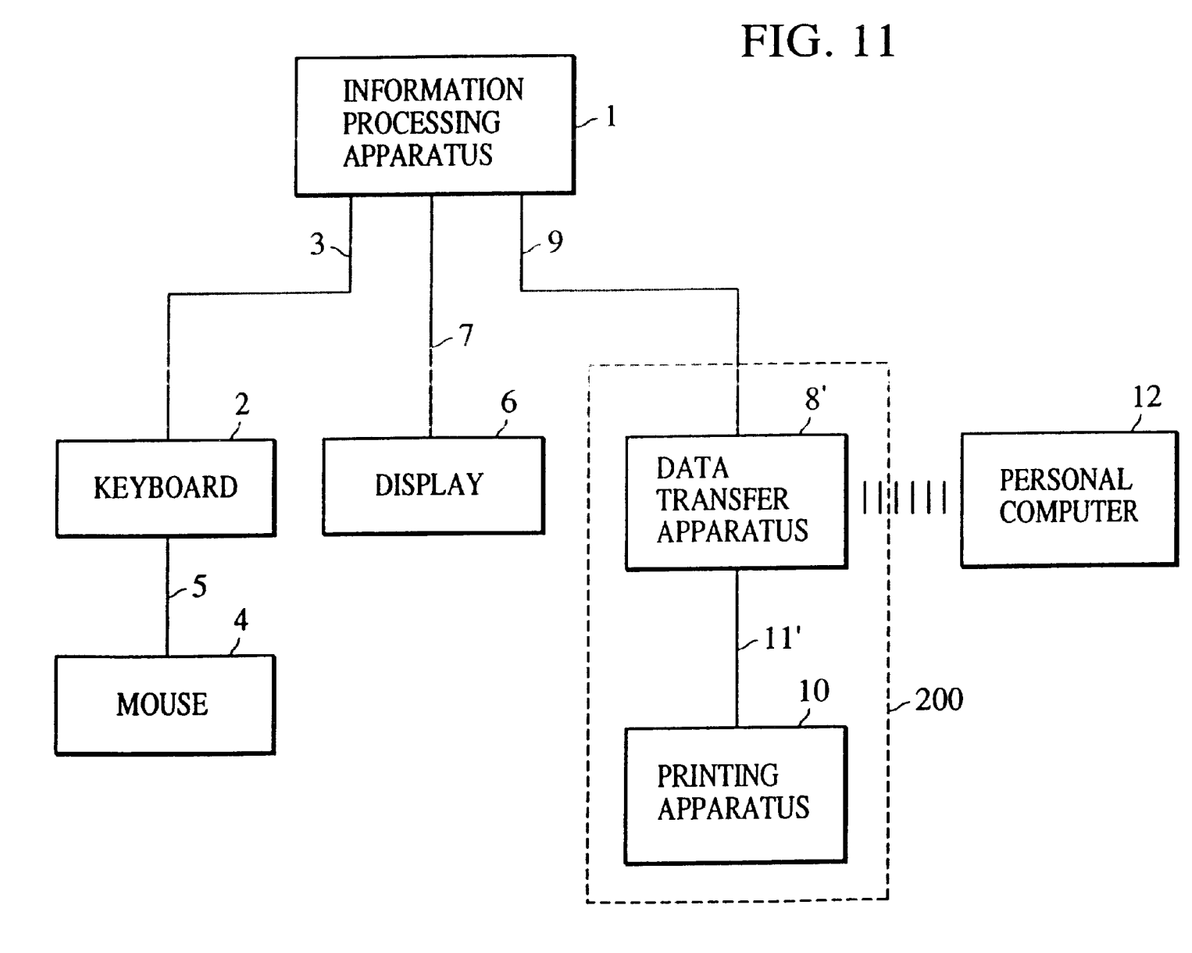
FIG. 11 is a block diagram illustrating another embodiment of an information processing apparatus according to the invention.

Alternatively, a data transfer apparatus 8' and the printing apparatus 10 may be integrated into a single apparatus as shown in FIG. 11. In this case, the communication line denoted by reference numeral 11' in FIG. 11 is not limited to such the type of communication line shown in FIG. 2, but other types of communication lines may also be employed.

The communication line shown in FIG. 2 may be one according to the IEEE-1394 standard or one according to the USB standard. Furthermore, although in the above embodiments, the personal computer 12 is provided with wireless communication means using an infrared ray, the present invention is not limited to such a computer but the wireless communication means may be one using a light ray other than an infrared ray or may be one according to other wireless communication techniques.

Furthermore, the present invention may be applied not only to personal computers but also to other apparatus such as digital cameras or portable information terminals having the capability of transferring data via an infrared ray or a wireless communication means.

What is claimed is:

1. An information processing apparatus comprising:
   receiving means for receiving data via a wireless interface;
   detecting means for detecting the state of a printing apparatus; and
   outputting means for outputting to the printing apparatus, directly through an interfacing cable, said data received via said receiving means when the detected state of the printing apparatus indicates that the printing apparatus is available, wherein said outputting means receives electric power from the printing apparatus directly through the interfacing cable.

2. An information processing apparatus according to claim 1, wherein said wireless interface is an infrared interface.

3. An information processing apparatus according to claim 1, wherein said cable interface includes:
   a first line for transferring said data; and
   another line provided separately from said first line, said another line serving to supply said electric power.

4. An information processing apparatus according to claim 1, wherein said cable interface is an interface according to the USB standard.

5. An information processing apparatus according to claim 1, further comprising conversion means for converting the data received via said receiving means to a signal in a format suitable for being transmitted via said cable interface.

6. An information processing apparatus according to claim 1, wherein said outputting means includes judgment means for judging whether data should be transmitted via said cable interface by evaluating the data received via said receiving means.

7. An information processing apparatus according to claim 1, further comprising:
   a controller for analyzing the received data and selectively controlling the outputting of the received data based on the analysis of the received data.

8. An information processing apparatus according to claim 1, further comprising:
   controlling means for controlling the directional flow of data signals in said information processing apparatus.

9. An information processing apparatus comprising:
   receiving means for receiving an infrared signal carrying modulated data;
   demodulating means for demodulating the infrared signal received via said receiving means so as to obtain demodulated data;
   detecting means for detecting the state of a printing apparatus; and
   outputting means for outputting to the printing apparatus the data demodulated by said demodulating means directly through a cable interfacing the printing apparatus and the outputting means when the detected state of the printing apparatus indicates that the printing apparatus is available, wherein said outputting means is supplied with electric power from the printing apparatus directly through the interfacing cable.

10. An information processing apparatus according to claim 9, wherein said cable interface includes:
    a first line for transferring said data; and
    another line provided separately from said first line, said another line serving to supply said electric power.

11. An information processing apparatus according to claim 9, wherein said cable interface is an interface according to the USB standard.

12. An information processing apparatus according to claim 9, further comprising second receiving means for receiving data, said second receiving means being provided separately from said receiving means, wherein said outputting means outputs, via said cable interface, the data received via said second receiving means.

13. A data transfer apparatus of a communication system provided with power supply means for supplying electric power via a communication line, said data transfer apparatus comprising:
    driving means for operating various parts of the communication system with electric power supplied directly through the communication line;
    wireless communication means for communicating using an infrared ray; and
    connection means for making a connection between said wireless communication means and the communication system via said communication line,
    wherein the communication line transmits data and electric power directly to the various parts of the communication system.

14. A data transfer apparatus according to claim 13, wherein said communication line includes one or two pairs of signal lines for transmitting serial data.

* * * * *

UNITED STATES PATENT AND TRADEMARK OFFICE
CERTIFICATE OF CORRECTION

PATENT NO. : 6,282,591 B1
DATED : August 28, 2001
INVENTOR(S) : Kuniaki Ohtsuka

It is certified that error appears in the above-identified patent and that said Letters Patent is hereby corrected as shown below:

<u>Title page,</u>
Item [57], ABSTRACT,
Line 14, "is" should read -- is in --.
Line 18, "data" should read -- the data --.
Line 24, "the a" should read -- a --.

<u>Column 5,</u>
Line 24, "printing" should read -- a printing --.

<u>Column 6,</u>
Line 7, "20.trans-" should read -- 20 trans- --.

<u>Column 7,</u>
Line 40, "other wise" should read -- otherwise --.

<u>Column 8,</u>
Line 1, "the structure" should read -- a structure as --;
Line 8, "the" should read -- a --;
Line 9, "shown" should read -- as shown --; and
Line 18, "the" should read -- a --; and "shown" should read -- as shown --.

Signed and Sealed this

Twentieth Day of August, 2002

*Attest:*

*Attesting Officer*

JAMES E. ROGAN
*Director of the United States Patent and Trademark Office*